United States Patent

Orsat et al.

[11] Patent Number: 5,990,653
[45] Date of Patent: Nov. 23, 1999

[54] METHOD FOR CONTROLLING THE SPEED OF A SINGLE-PHASE ASYNCHRONOUS INDUCTION MOTOR

[75] Inventors: Jean-Michel Orsat, Chatillon sur Cluses; Serge Bruno, Marnaz, both of France

[73] Assignee: Somfy, Cluses, France

[21] Appl. No.: 09/161,926

[22] Filed: Sep. 28, 1998

[30] Foreign Application Priority Data

Dec. 8, 1997 [FR] France .................................... 97 15471

[51] Int. Cl.$^6$ ............................................ H02P 1/26
[52] U.S. Cl. ........................ 318/772; 318/775; 318/778; 318/781; 318/797
[58] Field of Search .................................... 318/772, 778, 318/786, 812, 801, 798, 775, 781, 797; 363/49 R, 59, 37, 140, 41, 96

[56] References Cited

U.S. PATENT DOCUMENTS

| 4,459,532 | 7/1984 | Schutten et al. . |
| 4,520,303 | 5/1985 | Ward ........................................ 318/778 |
| 4,658,195 | 4/1987 | Min ........................................ 318/786 |
| 5,334,922 | 8/1994 | Manini ........................................ 318/772 |
| 5,402,053 | 3/1995 | Divan et al. ........................................ 318/768 |
| 5,598,080 | 1/1997 | Jensen et al. ........................................ 318/794 |

FOREIGN PATENT DOCUMENTS

| 0 291 803 | 11/1988 | European Pat. Off. . |
| 0 744 824 A1 | 11/1996 | European Pat. Off. . |
| 2 717 017 | 9/1995 | France . |

*Primary Examiner*—Bentsu Ro
*Assistant Examiner*—Rita Leykin
*Attorney, Agent, or Firm*—Bugnion S. A.; John Moetteli

[57] ABSTRACT

Method for controlling the speed of a single-phase asynchronous induction motor, the stator of which is equipped with a main winding (BP) and an auxiliary winding which consist of half-windings (B1, B2) which are magnetically coupled and wound in opposite directions, in which method the main winding is powered directly using an AC source and the auxiliary winding is powered using a current delivered by a full-wave rectifier and using two switching devices (T1, T2), so as to generate in the auxiliary winding a current which is phase-shifted by 90°. The method consists in varying the motor torque by altering the time that at least one of the switches spends closed/open.

6 Claims, 2 Drawing Sheets

Fig. 1
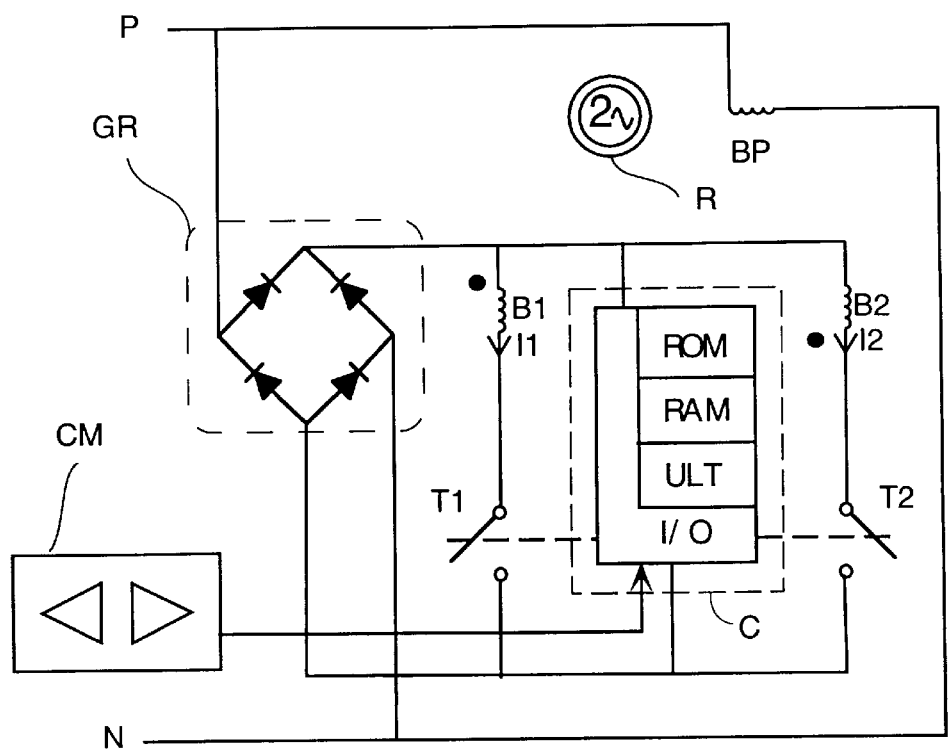
Fig. 2
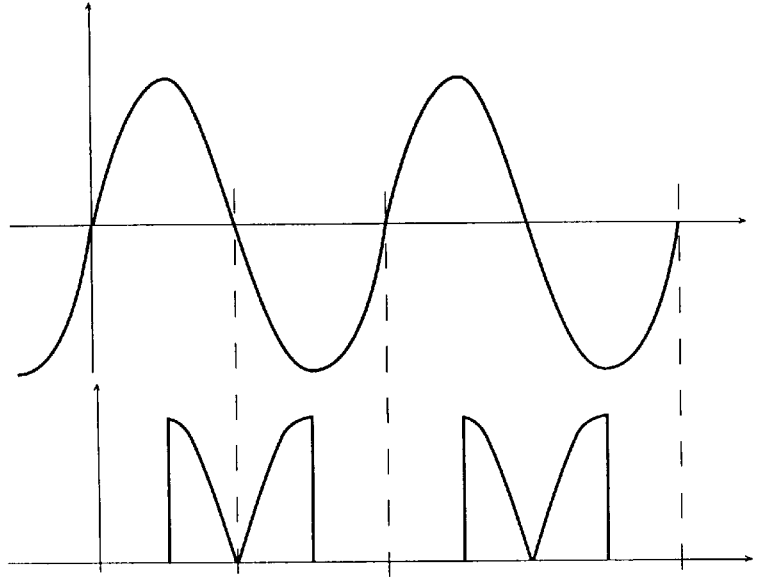
Fig. 3
Fig. 4
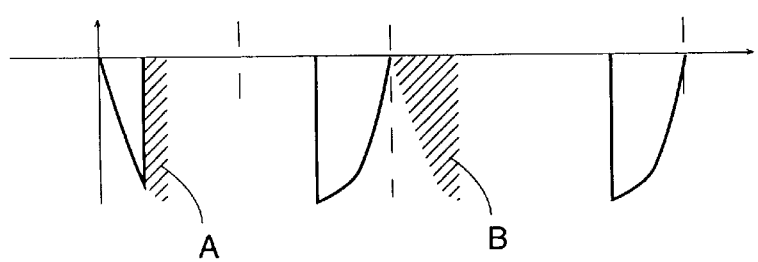

5,990,653

METHOD FOR CONTROLLING THE SPEED OF A SINGLE-PHASE ASYNCHRONOUS INDUCTION MOTOR

FIELD OF THE INVENTION

The subject of the present invention is a method for controlling the speed of a single-phase asynchronous induction motor, the stator of which is equipped with a main winding and an auxiliary winding which consist of half-windings which are magnetically coupled and wound in opposite directions, so that a current in a given direction creates in these half-windings, magnetic fields of opposite direction, in which method the main winding is powered directly using an AC source and the auxiliary winding is powered using a current delivered by a full-wave rectifier and using two switching devices, one in series with each of the auxiliary half-windings and controlled by a control circuit which closes/opens the switches at a frequency equal to the frequency of the supply voltage, so as to generate in the auxiliary winding an AC voltage which is phase shifted by 90° relative to the voltage in the main winding.

PRIOR ART

Such a method is applied in the induction motor described in U.S. Pat. No. 4,520,303. The control circuit consists of a bistable multivibrator alternately switching two transistors, one of which is in series with each of the auxiliary half-windings. Thus powered, the auxiliary winding creates a rotating field which is phase shifted by 90° relative to the field produced by the main winding, and this has the effect of rotating the motor rotor. No means of modifying the motor speed is provided.

U.S. Pat. No. 4,459,532 discloses a motor with an auxiliary winding in which an AC current phase-shifted by 90° with respect to the current in the main winding is obtained by means of two diagonally-paired switches controlled by a bistable multivibrator.

Patent FR 2 717 017, in the name of the applicant, also discloses a power-supply device for a single-phase motor with two windings comprising a current generator working by pulse-width modulation generating, in one of the windings, an AC current which is phase-shifted by 90° relative to the current in the other winding. This device allows the motor speed to be varied by varying the amplitude of the current-generator output voltage.

SUMMARY OF THE INVENTION

The object of the present invention is to control the speed of a motor of the type defined earlier, using a method which is simpler to implement than the method according to the prior art.

The method according to the invention is a method wherein the motor torque is varied by altering the time that at least one of the switches controlling each of the auxiliary half-windings spends closed/open.

According to a first embodiment of the method according to the invention, starting from a situation in which the switches are closed/opened in perfect alternation and for equal durations, the motor is slowed down by reducing the amount of time that at least one of the switches spends closed during each source-voltage period in such a way that the time spent closed is less than a supply-voltage half-period.

According to another embodiment of the method according to the invention, starting from a situation in which the switches are closed/opened in perfect alternation and for equal durations, the motor torque is reduced by increasing the amount of time that at least one of the switches spends closed during each source-voltage period in such a way that the time spent closed is greater than a supply-voltage half-period.

In both instances, a momentary cancellation of the alternating auxiliary magnetic field is obtained during each period of this field. The effect of this cancellation is that of reducing the motor output torque.

In fact, the torque-speed characteristic of the motor is modified. It is thus possible to vary the motor operating curve to adapt it to particular conditions of use, such as, for example, those of use with a centrifugally-unlocking mechanical brake which requires a higher torque at start-up.

A microprocessor will preferably be used by way of a control circuit.

BRIEF DESCRIPTION OF THE DRAWINGS

The method according to the invention will be better understood by the description of one embodiment explained in relation to the appended drawing, in which:

FIG. 1 diagrammatically depicts a motor with its control circuit;

FIG. 2 depicts the shape of the supply-source voltage or of the magnetic field created by the main winding;

FIG. 3 depicts the shape of the field created by one of the auxiliary half-windings;

FIG. 4 depicts the field created by the other auxiliary half-winding in the case of a restriction of the time that the associated switch remains open;

DESCRIPTION OF THE PREFERRED EMBODIMENT(S)

Figure 5:
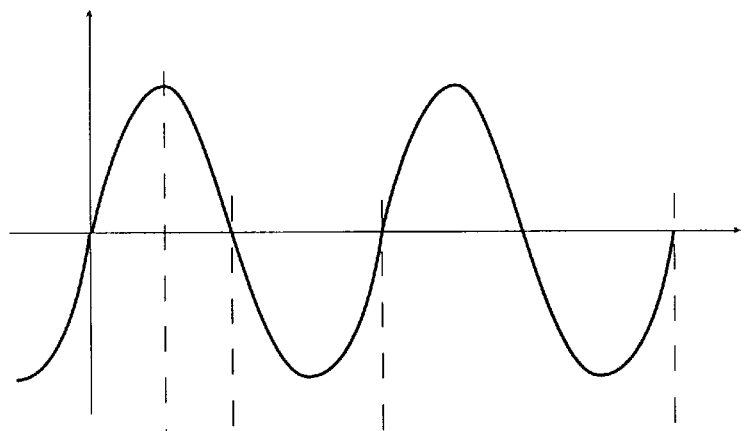
FIG. 5 is a repeat of FIG. 2.

In FIG. 1, the motor is depicted diagrammatically by its rotor R, its main winding BP and its auxiliary winding B1/B2. The main winding BP is powered directly with the supply voltage, here the mains P, N, while the auxiliary winding is powered via a full-wave rectifier bridge GR which rectifies the negative half waves so as to obtain a voltage made up only of positive half waves, as depicted in FIG. 2b of U.S. Pat. No. 4,520,303.

The auxiliary winding is made up of two half-windings B1, B2 having a common terminal and wound in opposite directions so that a voltage applied between this common terminal and the two independent terminals of the half-windings produces, in a turn of the winding B1, a magnetic flux in the opposite direction to the one produced in an adjacent turn of the winding B2 and so that the resulting magnetic flux in the gap between the stator and the rotor is zero. In order to obtain an alternating auxiliary field that is in quadrature with the field created in the main winding BP, the current in the half-windings B1 and B2 is controlled by means of two switches T1 and T2, in series with the half-winding B1 and half-winding B2, respectively, and with the bridge GR. The switches T1 and T2 will generally consist of transistors, preferably field-effect transistors. These transistors are controlled by a control circuit C connected across the output diagonal of GR and consisting of a microprocessor, that is to say a logic processing unit ULT, a RAM memory, a ROM memory and an input/output interface I/O. A manual control CM allows the times that the switches T1, T2 are open/closed, which times are recorded in the control circuit C, to be modified.

If the switches T1 and T2 are opened and closed in perfect alternation and for the same duration, so that the quarter waves of voltage picked off the bridge GR are applied alternately to the half-winding B1 and to the half-winding B2, a field of the shape depicted in FIG. 3 is created in one of the half-windings, for example B1, and a field of the same shape, but of opposite polarity and phase-shifted by 90° is created in the other half-winding. The resulting auxiliary field has the shape depicted in FIG. 2 and of U.S. Pat. No. 4,520,303.

If, now, the time that one of the switches, for example T2 to continue with the example under consideration, spends closed is reduced each period in a quarter of a half wave, as depicted as A, in FIG. 4, the resulting field is canceled for a short moment during each period, and this has the effect of under-powering the motor, that is to say of reducing its torque and speed. An entire quarter of a half wave may be eliminated, as depicted by the hatching B. It is possible to reduce the time that the two switches T1 and T2 spend closed.

The desired cancellation of the field resulting from the combination of the fields in the two half-windings B1 and B2 can also be obtained by addition or overlap, that is to say, starting from a situation in which the switches T1 and T2 are closed/opened in perfect alternation and for the same length of time, by increasing the time that one of the switches T1 or T2 or both switches at once spends or spend closed. This method of operation is illustrated in FIGS. 5 to 9.

Figure 6:
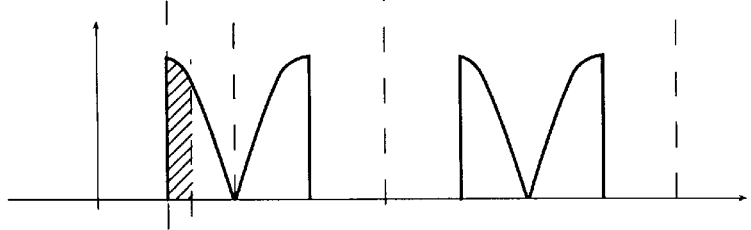
FIG. 6 once again depicts the field created by one of the auxiliary half-windings.
Figure 7:
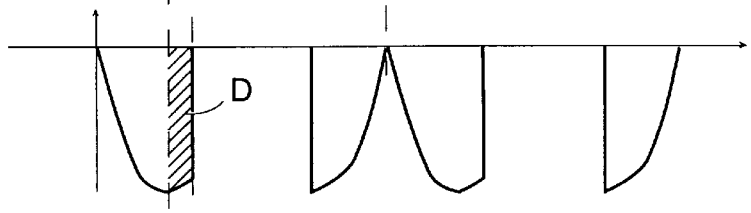
FIG. 7 depicts the shape of the field created in the other auxiliary half-winding by extending the length of time that the associated switch remains closed.
Figure 8:
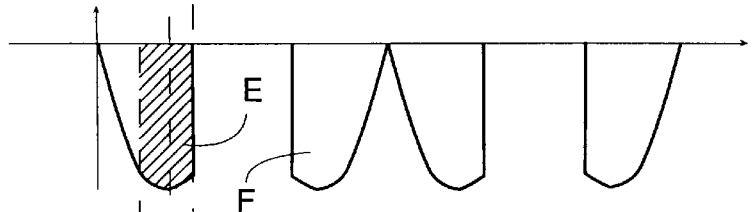
FIGS. 8 and 9 illustrate the case in which the time that the switches of both half-windings remain closed is extended.

FIG. 5 once again reproduces the shape of the field created in the main winding BP, which corresponds to the shape of the AC supply voltage. FIGS. 6 and 7 once more depict the shape of the field created in the two half-windings B1 and B2. The switch T1 is periodically closed during two exactly consecutive quarters of a period. By contrast, the time that the switch T2 spends closed is extended at the end of each period. This extension corresponds to the hatched area D in FIG. 7. It can be seen that in this hatched area, the magnetic field created in B2 overlaps the field created in B1 and that the sum of these fields is therefore zero in the hatched area. The auxiliary field that results from the combination of the fields in B1 and B2 is therefore periodically canceled for a duration that corresponds to the width of the hatched area D, and this has the effect of slowing the motor. It will be seen that this yields the same result as reducing the time that T2 spends closed, as described above, namely that of reducing the motor output torque.

Lengthening the time that one of the switches, for example T2, spends closed can be achieved by advancing the start of closure of T1 or T2 or by both advancing the start of closure of T1 or T2 and extending the time spent closed in the quarter of a half wave F. In this case there will be two overlaps per period, and this will further reduce the auxiliary field.

Figure 9:
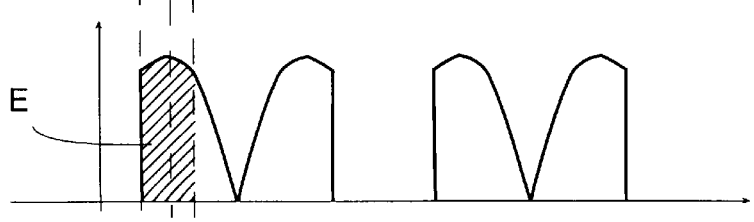

It is, of course, possible to increase both the time that the switch T1 spends closed and the time that the switch T2 spends closed. This situation is depicted in FIG. 9 which is to be considered in conjunction with FIG. 8. The overlap area obtained is represented by the hatched area E.

By altering the lengths of time that the switches T1 and T2 spend closed or open it is thus possible to combine all kinds of overlaps.

The two embodiments can be commented on as follows: the first embodiment amounts to underpowering the motor, leading to slight jerkiness, whereas with the second embodiment, there is no jerkiness but the motor is slowed down by an increase in power consumption.

We claim:

1. A method for controlling the speed of a single-phase asynchronous induction motor of the type having a stator equipped with a main winding (BP) and an auxiliary winding which consists of half windings (B1, B2) which are magnetically coupled and wound in opposite directions so that a current in a given direction creates in these half-windings, magnetic fields of opposite direction, the main winding being powered directly using an AC source and the auxiliary winding being powered using a current delivered by a full-wave rectifier and using two switching devices (T1, T2), one in series with each of the auxiliary half-windings and controlled by a control circuit (C) which closes/opens the switches at a frequency equal to the frequency of the supply voltage, so as to generate in the auxiliary winding an AC voltage which is phase-shifted by about 90° relative to the voltage in the main winding, the method characterized in that the speed is controlled by:

identifying an initial condition and varying the motor torque through altering the time that at least one of the switches remains open/closed.

2. The method as claimed in claim 1, wherein the altering of the time that at least one of the switches spends open/closed is carried out by the steps of:

starting from a situation in which the switches are closed/opened in perfect alternation and for equal durations, and reducing the amount of time that at least one of the switches spends closed during each source-voltage period in such a way that the time spent closed is less that a supply-voltage half-period.

3. The method as claimed in claim 1, wherein the altering of the time that at least one of the switches spends open/closed is carried out by the steps of:

starting from a situation in which the switches are closed/opened in perfect alternation and for equal durations, an slowing the motor down by increasing the amount of time that at least one of the switches spends closed during each source-voltage period in such a way that the time spent closed is greater than a supply-voltage half-period.

4. A single-base synchronous induction motor of the type having a stator equipped with a main winding (BP) and an auxiliary winding which consists of half windings (B1, B2) which are magnetically coupled and wound in opposite directions so that a current in a given direction create in these windings, magnetic fields of opposite direction, the main winding being powered directly using an AC source and the auxiliary winding being powered using a current delivered by a full-wave rectifier and using two switching devices (T1, T2) one in series with each of the auxiliary half-windings and controlled by a control circuit (C) which closes/opens the switches at a frequency equal to the frequency of the supply voltage, so as to generate in the auxiliary winding an AC voltage which is phase-shifted by about 90° relative to the voltage in the main winding, the improvement being that the motor includes a control (CM)

which controls the speed by varying the motor torque through altering the time that at least one of the, switches remains open/closed.

5. The motor as claimed in claim 4, wherein the control (CM) alters the time that at least one of the switches spends open/closed by:

starting from a situation in which the switches are closed/opened in perfect alternation and for equal durations, and reducing the amount of time that at least one of the switches spends closed during each source-voltage period in such a way that the time spent closed is less that a supply-voltage half-period.

6. The motor as claimed in claim 4, wherein the control (CM) alters the time that at least one of the switches spends open/closed by:

starting from a situation in which the switches are closed/opened in perfect alternation and for equal durations, and slowing the motor down by increasing the amount of time that at least one of the switches spends closed during each source-voltage period in such a way that the time spent closed is greater than a supply-voltage half-period.

* * * * *

UNITED STATES PATENT AND TRADEMARK OFFICE
CERTIFICATE OF CORRECTION

PATENT NO. : 5,990,653
DATED : November 23, 1999
INVENTOR(S) : Orsat et al.

It is certified that error appears in the above-identified patent and that said Letters Patent is hereby corrected as shown below:

<u>Column 4:</u>
Line 46, replace "an" by --and--;
Line 56, replace "create" by --creates--;

<u>Column 5:</u>
Line 2, replace "the," by --the--;
Line 12, replace "that" by --than--.

Signed and Sealed this

Nineteenth Day of June, 2001

*Attest:*

Nicholas P. Godici

NICHOLAS P. GODICI
*Attesting Officer*    Acting Director of the United States Patent and Trademark Office